United States Patent [19]

Barsotti

[11] 4,441,394
[45] Apr. 10, 1984

[54] TABLE SAW GUIDE APPARATUS

[76] Inventor: Mario Barsotti, 3475 Burr St., Gary, Ind. 46406

[21] Appl. No.: 412,622

[22] Filed: Aug. 30, 1982

Related U.S. Application Data

[63] Continuation-in-part of Ser. No. 327,822, Dec. 7, 1981.

[51] Int. Cl.³ .............................................. B27B 27/06
[52] U.S. Cl. ...................................... 83/409; 83/409.1; 83/416; 83/435.1; 83/477.1; 83/581
[58] Field of Search ................... 83/477.2, 435.1, 437, 83/409, 581, 415, 416, 409.1

[56] References Cited

U.S. PATENT DOCUMENTS

| | | | |
|---|---|---|---|
| 2,522,965 | 9/1950 | Schaufelberger | 83/409 |
| 2,894,543 | 7/1959 | Ivy | 83/435.1 |
| 2,905,210 | 9/1959 | Thomas | 83/416 |
| 3,830,127 | 8/1974 | James et al. | 83/435.1 |
| 4,164,882 | 8/1979 | Mericle | 83/409 |

*Primary Examiner*—Donald R. Schran
*Attorney, Agent, or Firm*—Bernard L. Kleinke

[57] ABSTRACT

A table saw guide apparatus includes a generally flat guide plate adapted to overlie the tabletop of a table saw, and an upstanding stop device is disposed adjacent to, and space laterally by a short distance from the saw blade. A projection is disposed on the underside of the plate and is adapted to fit securely within a tabletop groove for ficing the plate on the tabletop. A substantially flat workpiece carrier is disposed on, and in overlying relationship, with the upper surface of the plate. The carrier has an edge adapted to engage the stop device for slidable engagement therewith. The upper surface of the workpiece carrier is flush with the top edge surface of the stop device to permit the workpiece to rest on top of both the top edge surface device and the upper surface of the carrier. A gauge device is mounted removably in the upper surface of the carrier for engaging the workpiece and for helping position it angularly relative to the saw blade.

8 Claims, 5 Drawing Figures

TABLE SAW GUIDE APPARATUS

The present application is a continuation-in-part of the parent application Ser. No. 327,822 filed Dec. 7, 1981. The parent patent application is incorporated by reference herein, and is made a part hereof.

TECHNICAL FIELD

The present invention relates in general to table saw guide apparatuses, and it more particularly relates to an apparatus for use with a table saw to help guide workpieces into proper cutting relationship with the motor-driven saw blade thereof.

BACKGROUND ART

In the past, there have been many different types and kinds of mitering gauges for use with table saws. For example, reference may be made to the following U.S. Pat. Nos. 101,760; 2,594,651, 2,680,458; 2,894,543 and 4,158,320.

While such mitering gauges as shown in the foregoing mentioned patents may be satisfactory for some applications, it would be highly desirable to employ the guide apparatus disclosed in the foregoing mentioned parent patent application, and also enable the user to perform precision mitering saw cuts, in a convenient manner. In this regard, it would be highly desirable either to employ the guide apparatus of the foregoing mentioned parent patent application, in the manner as mentioned therein, or alternatively, to enable the foregoing mentioned guide apparatus to be used for making precision mitering saw cuts in a convenient manner.

DISCLOSURE OF INVENTION

Therefore, the principal object of the present invention is to provide a new and improved table saw guide apparatus, which enables the user to make saw cuts, including angular cuts, in workpieces of relatively short dimensions, and which is convenient to use.

Another object of the present invention is to provide such a new and improved table saw guide apparatus, which is able to be used for making precision mitering saw cuts, and which is relatively inexpensive to manufacture.

Briefly, the above and further objects of the present invention are realized by providing a table saw guide apparatus, which can be used in a convenient manner to make angular cuts in small workpieces, and which can also be used to make precision mitering cuts.

A table saw guide apparatus includes a generally flat guide plate adapted to overlie the tabletop of a table saw, and an upstanding stop device is disposed adjacent to, and spaced laterally by a short distance from, the saw blade. A projection is disposed on the underside of the plate and is adapted to fit securely within a tabletop groove for fixing the plate in place on the table top. A substantially flat workpiece carrier is disposed on, and in overlying relationship, with the upper surface of the plate. The carrier has an edge adapted to engage the stop device for slidable engagement therewith. The upper surface of the workpiece carrier is flush with the top edge surface of the stop device to permit the workpiece to rest on top of both the top edge surface device and the upper surface of the carrier. A gauge device is mounted removably in the upper surface of the carrier for engaging the workpiece and for helping position it angularly relative to the saw blade.

In this manner, the guide plate can be used for guiding workpieces into cutting relationship with the saw blade, for both perpendicular transverse cuts, as well as making angular cuts, in short or small workpieces. Alternatively, the workpiece can be placed in overlying engagement with the guide plate and used to make precision mitering cuts employing the gauge device on the upper surface thereof. In this regard, the carrier is slid along the upper surface of the guide plate as guided by the stop device.

BRIEF DESCRIPTION OF THE DRAWINGS

The above-mentioned and other objects and features of this invention and the manner of attaining them will become apparent, and the invention itself will be best understood by reference to the following description of the embodiments of the invention taken in conjunction with the accompanying drawings, wherein.

BEST MODE FOR CARRYING OUT THE INVENTION

Figure 1:
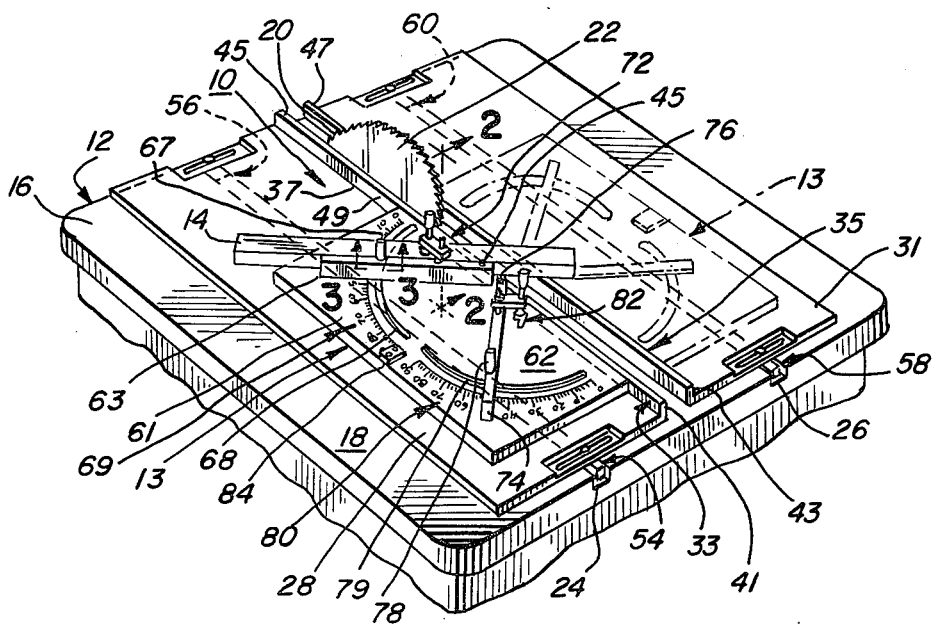
FIG. 1 is a pictorial, fragmentary view of guide apparatus which is constructed in accordance with the present invention, and which is shown mounted on a conventional table saw.

Referring now to FIGS. 1, 2, 3 and 4, there is shown a guide apparatus, generally indicated at 10, which is constructed in accordance with the present invention, which is shown mounted in place on an existing conventional saw table 12. The guide apparatus 10 includes a workpiece carrier 13 for supporting a workpiece 14 on a saw table 16 of the table saw 12 to facilitate movement of the workpiece along a tabletop 18, adjacent to an elongated saw opening 20 (FIG. 4) and into cutting engagement with a rotating circular table saw blade 22 extending upwardly therethrough. A pair of upwardly facing elongated guide grooves 24 and 26 extend parallel to one another on opposite sides of the saw blade 22 and spaced by a substantial distance therefrom. As hereinafter described in greater detail, the guide apparatus 10 overlies the guide grooves 24 and 26.

Considering now the guide apparatus 10 in greater detail, the guide apparatus 10 includes a pair of generally flat guide plates 28 and 31, which overlie the upper surface of the tabletop 18 and extend over the respective guide grooves 24 and 26. The guide plates include a pair of upstanding elongated stop devices 33 and 35, which extend along confronting straight side edges, such as the straight edge 37 of the guide plate 28. In this regard, the construction and the use of the guide plates 28 and 31 are identical in all respects to the corresponding numbered guide plates in the foregoing mentioned parent patent application. Moreover, the guide plates 28 and 31 can be used in the same manner as described in the foregoing mentioned parent patent application, for making either perpendicular transverse or angular saw cuts in workpieces, including very small or short workpieces (not shown).

The stop devices 33 and 35 generally comprise a pair of upstanding flanges 41 and 43, which have respective top edges 45 and 47. The flanges 43 and 45 also have upright carrier engagable surfaces, such as the carrier engagable surface 49 of the flange 41. In this regard, when precision mitering saw cuts are required, the workpiece carrier 13 is used and is placed on top of the plate 28. The carrier 13 rests on top of the plate 28 and can be moved into engagement with the flange 33 and slid therealong to move the workpiece 14 into cutting engagement with the saw blade 22. Alternatively, the workpiece carrier 13 can be positioned as indicated in phantom lines in overlying engagement on the guide plate 31. In this regard, the workpiece carrier 13 can be slid along the upper surface of either on of the guide plates 28 and 31, to carry a workpiece into cutting engagement from either the left or the right side of the saw blade 22, depending on the grain of the wood of the workpiece 14.

As hereinafter described in greater detail, by employing the workpiece carrier 13 of the present invention, precision mitering cuts can be readily made in the workpiece. Depending on the grain of the wood of the workpiece, the workpiece carrier 13 may be used on the plate 31.

The guide plates 28 and 31 are removably secured to the tabletop 18 in the same manner as the correspondingly numbered guide plates disclosed in the foregoing mentioned parent application, are secured to their tabletop. In this regard, the underside of the guide plate 28 is provided with a pair of aligned and spaced apart projections 54 and 56, which fit securely within the guide groove 24. Similarly, a pair of spaced-apart aligned projections 58 and 60 depend from the underside of the guide plate 31 and fit securely within the guide groove 26.

Considering now the workpiece carrier 13 in greater detail, the carrier 13 includes a thin flat block or plate 61 having an upper surface 62. A gauge arm 63 is pivotally attached at 65 to the upper surface 62 to position the workpiece 14 thereagainst. A set screw 67 is disposed at the opposite end of the arm 63 to retain it in a desired angular position in engagement with an arcuate slot 68, thereby positioning the arm at the desired precise angular position for guiding the workpiece 14 into cutting relationship with the saw blade 22. In order to measure the proper angular relationship, a set of graduated markings 69 are disposed adjacent to the arcuate slot 68 so that the arm 63 can be positioned in a desired one of an infinite number of positions between a parallel position and a position at right angles to the saw blade 22. A hold-down clamp 72 is attached to the upper edge of the gauge arm 63 to clamp the workpiece 14 against the upper surface of the flat block 61, whereby the flat block 61 can be slid along the upper surface of the guide plate 28 and the workpiece 14 is securely attached thereto for presenting it to the rotating saw blade 22.

A similar gauge arm 74 is also mounted on the upper face of the flat block 61 to enable a mating saw cut to be made in another workpiece (not shown) to provide the two workpieces with a mitered joint. The arm 74 is generally similar to the gauge arm 63, and is pivotally attached at 76 near the pivot point 45. A set screw 78 extends through the outer end of the arm 74 into an arcuate slot 79 having a set of graduated markings 80 extending therealong, in the same manner as the set screw 67 cooperates with the arcuate slot 68 having the graduated markings 69. The graduated markings 80 indicate the positioning of the arm 74 between a parallel position and a position perpendicular to the saw blade 22, or any angular position therebetween.

A hold-down clamp 82 is fastened to the upper side of the arm 74 and is similar to the hold-down clamp 72. In this regard, it is adapted to secure a workpiece releasably in overlying relationship on the upper surface of the flat block 61, so that the workpiece is held firmly in place thereon as the carrier 13 slides along the plate 28 to carry the workpiece into cutting engagement with the saw blade 22.

Figures 4, 5:
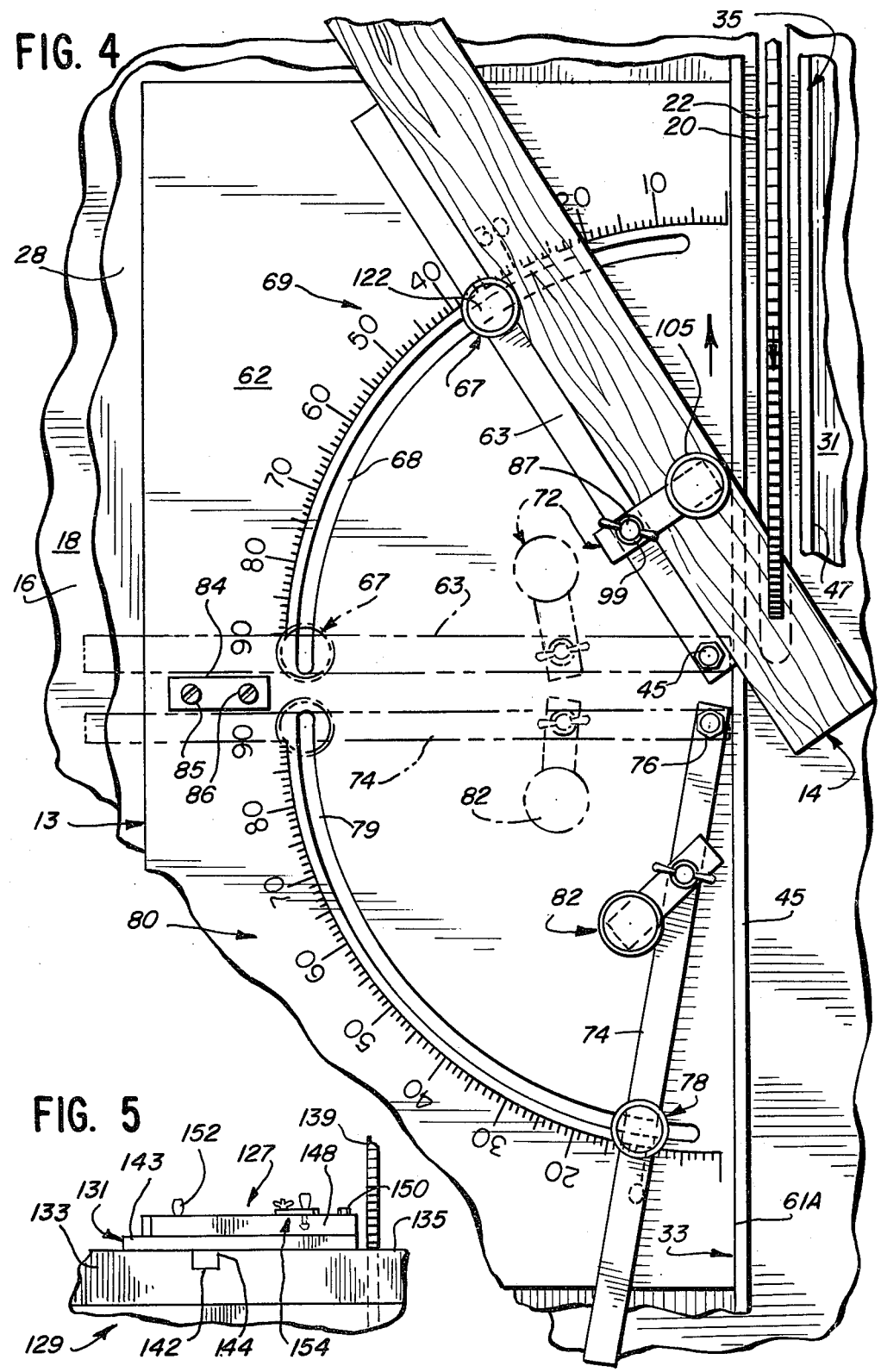
FIG. 4 is a greatly enlarged, fragmentary face view of the guide apparatus of FIG. 1.
FIG. 5 is an elevational view of guide apparatus, which is also constructed in accordance with the present invention, and which does not employ the guide plates of the present invention.

A stop block 84 is fastened by means of a pair of screws 85 and 86 to the upper face of the flat block 61 near the outer ends of the arms 63 and 74 when disposed in their perpendicular (90°) positioning as indicated in phantom lines in FIG. 4. In this manner, when the arm, such as the arm 63, is disposed at the 90° indicia, as indicated in phantom lines in FIG. 4, the workpiece can be cut at right angles to the saw blade 22, and the stop block 84 serves to be a reinforcement or back stop for the workpiece 14, as it is being cut by the rotating saw blade 22.

Figure 2:
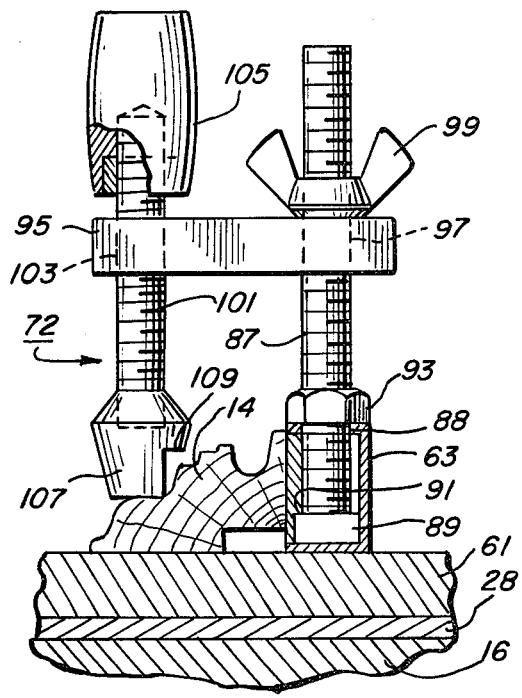
FIG. 2 is an enlarged, detail sectional view of the hold-down device of the carrier of the guide apparatus of FIG. 1, taken substantially on line 2—2 thereof.

Considering now the hold-down clamps in greater detail, the hold-down clamp 72 will now be described in greater detail with reference to FIG. 2, it being understood that the clamp 82 is generally similar to it and thus need not be described in greater detail. The hold-down clamp 72 includes an upright bolt 87 which extends through a hole 88 in the arm 63, and has its bolt head 89 disposed within the hollow interior of the arm 63. The bolt head 89 fits within a recess 91 at the bottom of the arm 63. A nut 93 secures the bolt 87 to the arm 63.

A link 95 includes at one of its ends, a threaded hole 97, which receives the bolt 87 threadably and a wing nut 99, which serves as a lock nut, is threaded onto the bolt 87 against the upper surface of of the link 95. In this manner, the height of the link 95 is adjustable, and the angular position of the link 95 can also be adjusted.

A threaded rod 101 extends through a threaded hole 103 in the opposite end of the link 95, and is supported thereby. A knob 105 is fixed to the upper end of the threaded rod 101 to enable the user to grasp it with the fingers to adjust the threaded rod 101 positionally vertically relative to the link 103. A pad 107 at the lower end of the vertical threaded rod 101 includes a notch 109, and is adapted to be pressed against the workpiece 14 as indicated in FIG. 2. The pad 107 is preferrably composed of suitable resilient material, such as rubber or any suitable elastomeric material.

Figure 3:
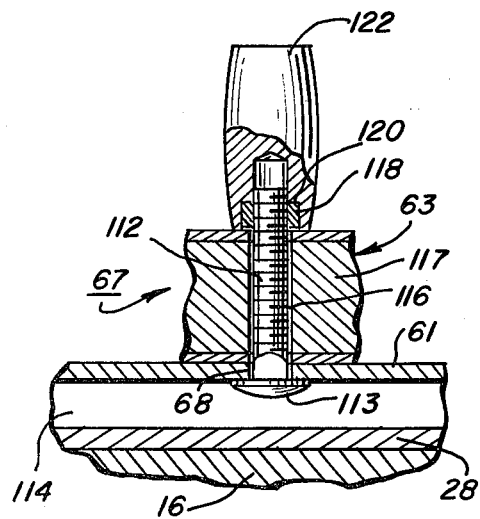
FIG. 3 is an enlarged fragmentary sectional view of a set screw device for the workpiece carrier of the guide apparatus of FIG. 1, taken substantially on line 3—3 thereof.

Considering now the set screws, with reference to FIG. 3, the set screw 67 will now be described in greater detail, it being understood that the set screw 78 is generally similar to it. The set screw 67 includes a vertical bolt 112 which extends through the arcuate slot 68 and has its bolt head 113 disposed in an opening 114 in the underside of the thin block 61. An aligned hole 116 extending through the gauge arm 63 which has a solid filler bar 117 disposed in the interior of the arm 63 to rigidify it in the area of the set screw. A nut 118 is threaded onto the bolt 112 against the upper surface of the arm 63 and is disposed within a recess 120 in the bottom end of a knob 122, which is adapted to be grasped by the fingers of the users rotate the bolt 112 manually to loosen and/or tighten the arm 63 against the upper surface of the flat block 61.

In operation, the guide plates 28 and 31 are first positioned in overlying engagement with the table top and secured in place thereon, by fitting the projections into the guide groove. In this manner, the guide plates can be used to facilitate the saw cutting of workpieces, as described in greater detail in the aforementioned parent patent application.

In order to make precision mitering saw cuts, the workpiece carrier 13 is placed on top of the plate 28, with a smooth side edge 61A of the block 61 disposed in engagement with the upright carrier engagable surface 49, in the position shown in FIG. 1. The arm 63 is then adjusted angularly relative to the flat block 61 by manually moving it pivotally about the pivot point 45. The set screw 67 is then tightened at the desired location. The workpiece 14 is then secured flush against the arm 63 and pressed firmly against the block 61 by the hold-down clamp 72.

The workpiece carrier 13 is then slid manually over the table top, while maintaining the side edge 61A in engagement with the surface 49 to guide the workpiece into cutting engagement with the saw blade 22, as indicated in FIG. 4, to achieve the desired mitering cut in the workpiece 14. It should be noted that the height of the block 61 is substantially equal to the height of the stop device 33, so that the workpiece 14 extends from the block 61 toward the saw blade 22 and can rest on top of the device 33.

Another workpiece (not shown) can then be clamped onto the workpiece carrier by means of the clamp 82, so that a complementary mitering cut can be made therein.

In order to enable a workpiece to be cut in a proper manner relative to the grain of the wood, it may be necessary to perform the operation by employing the plate 31 in place of the plate 28. In this regard, the carrier 13 is placed on top of the plate 31 in the position as indicated in phantom lines in FIG. 1, with the edge 61A engaging the upright carrier engageable surface of the plate 31. Thereafter, the operation is performed in a manner similar to the one described when the plate 28 is used.

Referring now to FIG. 5, there is shown a guide apparatus 127, which is also constructed in accordance with the present invention, and which does not employ the guide plates as shown in FIG. 1. The guide apparatus 127 is adapted to be mounted on a conventional table saw 129, which is similar to the table saw 12 of FIG. 1. The guide apparatus 127 includes a workpiece carrier 13 of FIG. 1, and which is slidably mounted directly on overlying engagement on a table top 135 of a saw table 133 of the table saw 129. A circular saw blade 139 extends above the surface of the table top 135, and the workpiece carrier 131 is adapted to slide rectilinearly reciprocatively over the table top 135 parallel to the saw blade 139 to carry a workpiece (not shown) into cutting engagement therewith, in a manner similar to the operation of the workpiece carrier 13 of FIG. 1.

A pair of elongated guide grooves, such as the elongated guide groove 142, is disposed on the upper face of the table top 135 in a similar manner as the elongated grooves 24 and 26 are provided in the table saw 12 of FIG. 1. The workpiece carrier 131 includes a plate or thin flat block 143, which has a pair of projections, such as the projection 144 depending from the underside of the plate 143, in a similar manner as the projections extending from the workpiece carrier 13 of FIG. 1. The projections fit slidably within the guide groove 142 so that the plate 143 can be slid along the upper surface of the table top 135.

The workpiece carrier 131 includes a gauge arm 148 pivotally attached at 150 to the upper surface of the thin flat block 143. A set screw 152 extends through the opposite end of the arm 148 and fits into an arcuate slot (not shown). A hold-down clamp 154 is mounted intermediate the pivot point 150 and a set screw 152 to serve the same purpose as the hold-down clamps 72 and 82 of FIG. 1.

In this regard, the workpiece carrier 131 serves the same function as the workpiece carrier 13 of FIG. 1, except that it slides directly in overlying engagement with the table top within the elongated guide groove 142 and does not cooperate with the guide plates as shown in FIG. 1.

I claim:

1. Guide apparatus adapted for use with table saw equipment including a table having a table top and having a motor-driven upright saw blade, for cutting a workpiece, said table top including an upwardly facing groove extending parallel and spaced from the plane of the saw blade, comprising:

a generally flat guide plate adapted to overlie and directly engage the table top;

upstanding stop means connected to said plate and disposed adjacent to, and space laterally by a short distance from, the saw blade, said stop means having top edge surface means for resting the workpiece thereon and for guiding it therealong;

projection means being disposed on the underside of said plate and being adapted to fit securely within the table top groove for fixing said plate in place on the table top; and a substantially flat workpiece carrier being on and overlying the upper surface of said plate, said carrier adapted to engage said stop means for slidable engagement therewith, the upper surface of said workpiece carrier being flush with said top edge surface means to permit the workpiece to rest on top of said top edge surface means and said upper surface of said carrier, said carrier including gauge means mounted on the upper surface thereof for engaging the workpiece and for helping position it angularly relative to the saw blade.

2. Guide apparatus according to claim 1, further including second stop means being disposed adjacent to and spaced laterally by a short distance from the opposite side of the saw blade, said second stop means having a second top edge surface means for resting along the workpiece thereon and for guiding it therealong, said second stop means having upright workpiece-carrier engageable surface means facing away from the saw blade.

3. Guide apparatus according to claim 1, wherein said stop means includes an elongated stripe composed of rigid material.

4. Guide apparatus according to claim 1, wherein said plate has a substantially straight side edge, said stop means being connected to said plate at straight edge and extending upwardly from the plane of said plate.

5. Guide apparatus according to claim 4, wherein said stop means includes an elongated upstanding flange integrally connected to said straight edge and bent upwardly at right angles to said plate.

6. Guide apparatus according to claim 1, wherein said carrier includes a thin flat block, said gauge means includes a gauge arm pivotally attached to the upper surface of said carrier block.

7. Guide apparatus according to claim 6, wherein said gauge means includes a second gauge arm pivotally attached to the upper surface of said carrier block, first and second set screws for attaching the arms releasably in desired angular positions on the upper surface of said block, and first and second hold-down clamping devices mounted on the first-mentioned and said second arms, respectively, intermediate the pivot points and the set screws for securing workpieces to the upper surface of said carrier block to move therewith over the surface of said guide plate.

8. Guide apparatus according to claim 7, wherein each one of said hold-down devices includes a first upstanding elongated member extending upwardly from its arm, a transverse link is swingably mounted on said first member, and a second upstanding elongated member movably mounted on said link and carried thereby for engaging forcibly the upper surface of the workpiece to press it against one of the guide plates.

* * * * *